United States Patent Office 3,248,251
Patented Apr. 26, 1966

3,248,251
INORGANIC COATING AND BONDING
COMPOSITION
Charlotte Allen, Mechanicville, N.Y., assignor to Teleflex Incorporated, North Wales, Pa., a corporation of Delaware
No Drawing. Filed June 28, 1963, Ser. No. 291,271
33 Claims. (Cl. 106—286)

This invention relates to coating and bonding compositions which are highly suitable for coating various surfaces, particularly metal, to impart protective or other characteristics thereto or which may be used as compositions for bonding two surfaces together. This application is a continuation-in-part of my pending U.S. patent applications Serial No. 166,385, Serial No. 166,386 and Serial No. 166,398, all filed January 15, 1962, and now all abandoned.

Because of the various outstanding engineering advances that have been made in recent years there exists today more than ever a serious need for improved materials capable of withstanding severe conditions of heat, abrasion, corrosion and the like. In fact, it is generally agreed that the chief bottleneck today to further outstanding technological progress is that of materials limitations. The greatest problems arise where environmental conditions call for a material having some combination of two or more outstanding physical properties, for example, high heat resistance and good flexibility or tensile strength. The science of ceramics can provide excellent high heat resistant materials, and the science of metallurgy has made available a wealth of alloys having good tensile strength or flexibility plus reasonably good heat resistance; however, none of the arts or sciences has been able to provide a material with all three properties to a high degree. While a few exotic materials do exist which have remarkable physical and chemical properties, they are so rare and therefore so expensive as to be impractical for widespread commercial use.

One of the approaches to the problem has been that of developing composites of two or more materials to attain the desired combination of physical and chemical properties. The coating and bonding art falls within this general area. Remarkable success has been had in this art in formulating coating and bonding materials for relatively low temperature environments. Such compositions are organics, usually organic polymers. In general, they are characterized by excellent flexibility, fair to good adhesion depending upon the substrate, fair to good resistance to corrosion or chemical attack by inorganics but poor as against some organics, poor abrasion resistance and very poor heat resistance. Teflon, for example, provides about as high a heat resistance as is attainable with an organic coating or bonding material and it is good only up to about 600° F., and this at the sacrifice of good adhesion. In the other direction, ceramics and inorganic chemistry have provided coating and bonding compositions which have excellent heat and abrasion resistance, fair to good adhesion depending upon the substrate, good resistance to chemical attack or corrosion by organics and some inorganics, but very poor flexibility and mechanical strength. In general, ceramic coatings available today are quite frangible and are really only satisfactory where they are applied to a ceramic or similar substrate where flexibility is not a requirement. Much work has been done on other types of inorganic coatings, i.e. non-ceramic inorganic coatings or surface treatments for steel and the like, chiefly to provide increased corrosion resistance. For example, it is well known and in fact common practice to phosphate and/or chromate treat sheet steel and the like and to anodize aluminum to provide a surface having improved resistance to rust or other corrosion; however such treatments add little or nothing in the way of heat and abrasion resistance and are used for the most part only as a pretreatment prior to coating the metal with paint or other organic material. In summary, then, none of the sciences has yet succeeded in fulfilling the need for a coating and bonding material which has the combination of excellent adhesion to a wide variety of substrates, excellent heat and corrosion resistance, excellent resistance to abrasion along with good flexibility. The present invention fulfills this need. In fact, coating and bonding compositions can be formulated in accordance with the present invention which not only possess the aforedescribed combination of excellent physical properties but also other highly useful physical and chemical properties such as electrical conductivity, decorative appearance, lubricity as well as others.

This, then, is the principal object of the invention: to provide an improved composition and method for coating and bonding, and to provide improved resultant coated articles. More specifically, the invention has as its object the provision of a coating and bonding composition which can be applied to any of a wide variety of substrate materials as by spraying or dipping and which after being heat-cured provides a coating or bond which has excellent adherence, heat resistance, abrasion and corrosion resistance, resistance to chemical attack, flexibility and any of a number of other useful physical and chemical properties as desired. Other objects and advantages of the invention will be apparent from the following detailed discussion thereof and from the description of various preferred embodiments.

Briefly, the aforesaid objects are accomplished in accordance with the present invention by applying to the surface or surfaces to be coated or bonded, and then heat curing, a composition consisting essentially of a uniform mixture or dispersion of a solid particulate material in an aqueous solution containing substantial amounts of phosphate anion, anion selected from the group consisting of chromate, molybdate and mixtures thereof, preferably all chromate, and metal cation. In all the preferred compositions of this invention, the concentration of the phosphate ion is from 1 to 4 mols per liter, that of the chromate and/or molybdate ion from .5 to 3 mols per liter, and that of the metal ion from 1 to 4 mols per liter. The solid particulate material, which should preferably have a grain size of less than about 100 mesh, ideally 325 mesh or less, can be any of a wide variety of metallic and nonmetallic materials, the precise choice depending upon the characteristics desired of the coating or bond. Various preferred solid particulate materials will be specified hereinafter; however, by reason of the superior combination of the desirable physical properties it imparts, aluminum powder, alone or in combination with other particulate materials, has been found outstandingly advantageous. The amount of solid particulate material included can be from 10 to 2000 grams per liter of solution, the optimum amount depending upon the precise use to be made of the composition and, when measured on a weight basis, on the weight per unit volume of the particulate material employed. For most uses, however, the preferred range is from about 300 to 1000 grams of the solid particulate material per 1000 cc. of the phosphate-chromate-metal ion solution, about 800 grams per 1000 cc. being ideal where aluminum powder is used. It will be manifest that the ion concentrations herein set forth include all of the dissolved material to which reference is made, whether existing in associated or disassociated form.

The phosphate anion can be introduced into the aqueous solution in the form of phosphoric acid, in the form of phosphates of the metal or metals desired to be included as the metal cation, or, as is preferred, it can be added in both forms. It will be understood that the term "phosphate" is intended to comprehend not only the $PO_4^{---}$ ion, but also the $HPO_4^{--}$ and $H_2PO_4^{-}$ ions. All three, for example, result from the ionization of $H_3PO_4$ and the hydrogen phosphate ions generally will, at least to some extent, be present in the compositions of this invention. Where phosphoric acid is used as an additive in making the compositions it is much desired to use the ortho acid, $H_3PO_4$, though the invention also comprehends the use of the other forms such as the meta or pyro acids, all ionizing in water to provide phosphate anion.

The chromate anion can be added either as chromic acid, or its anhydride $CrO_3$, or as a chromate or dichromate, of the metal or metals desired to be added as the metal cation. Combinations of the acid and the metal salts can, of course, also be used. If molybdate anion is used, it can be added as molybdic acid, or as the anhydride $MoO_3$, or as metal molybdate.

It will be manifest that the chromate may be present in the solution at least in part as the dichromate ion and hence the term "chromate" ion as used herein is intended to comprehend both chromate and dichromate; however, for purposes of uniformity and simplicity in defining molar concentration all the chromate is assumed to be present as chromate rather than dichromate though in fact it may be present as the latter.

The metal cation can be added either as a metal phosphate, chromate, dichromate, or, where molybdate ion is desired, as a metal molybdate, all as indicated above. Also, the metal can be added, in whole or in part, in a form, such as the oxide, hydroxide or carbonate, which will dissolve in phosphoric acid or chromic acid to produce the metal phosphate or chromate. Of course, if the carbonate is used, carbon dioxide will be evolved. It will be manifest that where the metal is so added, for example, as oxide, at least some of the phosphate, chromate or molybdate must be added as acid, or as acid anhydride, to provide the acidity required for the acid-base reaction. The valence +2 and +3 metal cations are preferred and for most uses of the compositions magnesium ion is outstandingly advantageous.

Numerous examples of preferred formulations in accordance with the above will be set forth hereinafter; however, it is appropriate at this point, for purposes of immediate illustration, to specify one highly preferred formulation.

Example I

| | | |
|---|---|---|
| Aluminum (spherical, 5–10 micron) | grams | 80 |
| Phosphate-chromate-metal ion solution | cc | 100 |
| Solution made by mixing: | | |
| $H_3PO_4$ (85% aqueous solution) | cc | 20 |
| MgO | grams | 5 |
| $Mg(H_4PO_4)_2 \cdot 3H_2O$ | do | 5 |
| $MgCr_2O_7 \cdot 6H_2O$ | do | 15 |
| Water, to 100 cc. | | |

Calculation will show that the solution contains approximately 3 m./l. phosphate ion, 1 m./l. chromate ion and 2 m./l. metal (magnesium) ion.

The order of addition of ingredients in making up the phosphate-chromate-metal ion solution is not critical though for utmost ease, it is generally preferred to first prepare an aqueous phosphoric acid solution and then add to this the other components required, the last added ingredients being the solid particulate material which, upon thorough admixture, forms a slurry with the phosphate-chromate-metal ion solution. On standing the solid particulate material may, of course, settle out and hence shaking to reform a uniform slurry is generally desirable just prior to use. The compositions have a very long shelf life though for some particulate materials there may be some reaction between the solution and the solid material, this having no detectable disadvantage. For example, where aluminum powder is used as the solid particulate material, there may be slight reaction as evidenced by the development of green tinge on standing, apparently because of reduction of some of the chromate ion.

The prepared composition, i.e., the mixture of solid particulate material and the phosphate-chromate-metal ion solution, is applied, as by spraying, dipping, rolling or brushing, to the surface or surfaces to be coated or bonded and is subsequently cured by heating, a temperature of about 500° F. to 1000° F. generally being required. The optimum curing temperature will vary depending upon the precise composition being cured; in general, however, the preferred curing temperature is from about 600 to 800° F. After complete curing, the coating or bond will be insoluble in water even on prolonged exposure thereto. If there is an incomplete cure, the solution ingredients in the composition will leach out when exposed to water and this will be evidenced by the yellow or orange color of the chromate ion when, for example, a damp rag is wiped across an uncured or incompletely cured surface. The time required for curing is dependent upon the temperature used; the higher the temperature the less time needed. For example, for a relatively slow cure of a given coating at low temperature, about 15 to 60 minutes at 600° F. would be desirable. Where a fast cure is required, about 5 to 10 minutes at 800° F. could be used. For an extremely fast cure radiant heating at even higher temperature can be used to advantage; this is particularly useful where the substrate is of a material not highly heat resistant since by high temperature radiant heating the coating can be fully cured without developing excessive temperature in the substrate. In general, the compositions cannot be overcured, within relatively wide limits, and hence except for cost and any temperature limitation on the solid particulate material being used or on particular substrate material involved, there is no disadvantage in curing for longer periods of time or at higher temperatures than required, say 60 minutes at a temperature on the order of 700° F. where 15 minutes at 600° F. would be sufficient.

Heat curing of the composition to water insolubility is essential to the attainment of the desirable physical characteristics and from this it will be manifest that the solid particulate material used must be capable of withstanding the curing temperature without disintegrating.

The thickness of the coating or bond after curing should preferably be from about .0005 to .02 inch and hence the precise concentration of the liquid composition applied and the amount applied should preferably be adjusted accordingly. In some instances it will be desirable to apply two or more coatings with or without curing between coats. The compositions of this invention exhibit excellent surface tension characteristics and thoroughly wet the substrate, even though it be of a material difficult to wet with water. Hence, there is no requirement to use organic wetting agents to obtain a good uniform coating. The surface being coated should of course be clean and while there is no requirement to roughen an otherwise smooth surface prior to coating, such will often be desirable to obtain maximum bond strength.

As alluded to previously, coating and bonding compositions can be accomplished in accordance with the present invention having a remarkable and in fact unique combination of desirable physical properties including the following: (1) high corrosion resistance—sufficient to withstand, for example, over 250 hours and a high as 3,000 hours in an accelerated 5% salt spray corrosion chamber, (2) high heat resistance, on the order of what would be expected of a ceramic, (3) excellent adhesion, even to surfaces which are otherwise difficult to bond, and over a wide temperature range to as low as −300° F., (4) high abrasion resistance, again on the order of what would be expected of a good ceramic, and (5) good flexibility, on the order of that normally expected only of an organic coating as distinguished from a ceramic coating.

Of course, other desirable physical characteristics can additionally be imparted by appropriate choice of the solid particulate material included in the coating or bond. For example, excellent electrical conductivity can be accomplished by using aluminum powder as the solid particulate material, and excellent electrical insulativeness by using aluminum oxide. Superior heat resistant lubricative coatings are attainable by using graphite or molybdenum disulfide. Further, any of the above enumerated desirable physical characteristics, for example, heat resistance, can be emphasized or obtained to a greater extent by choice of the solid particulate material. To illustrate, exceptionally high heat resistivity results when boron nitride is used as the solid particulate material. Frequently it will be desirable to use a combination of two solid particulate materials to attain a specific set of physical properties. As an example, molybdenum disulfide and molybdenum disilicide can be used in combination to provide an excellent high heat resistant lubricative coating with especially good abrasion resistance. Other illustrations of this wide choice of desirable physical properties attainable will be evident from the examples hereinafter set forth of coatings and bonds in accordance with various preferred embodiments of the invention.

No precise reasons or complete explanation can be advanced which would account for the outstanding physical properties attainable with the coating and bonding compositions of this invention. What is known, however, is that the properties are far superior to those which could be expected from the combination of the solid particulate material and the phosphate-chromate-metal ion solution. For example, if steel sheet stock is coated, in accordance with the invention, with a composition containing aluminum powder as the solid particulate material, the heat resistance thereby imparted to the sheet stock is actually considerably higher than that of the sheet stock itself, this together with excellent flexibility, corrosion resistance and other properties. The additive properties of aluminum and of the phosphate-chromate-metal ion solution cannot account for this, particularly as regards the extremely high heat and corrosion resistance. It is theorized that the excellent physical properties attained with the present invention result, at least in part, by reason of some chemical reaction or possibly some physical relationship which takes place or is established between the phosphate, chromate, metal ion solution components, or a complex formed thereby, and the surfaces of the solid particulate material during curing. If there is chemical reaction with the particles, however, it does not appear to be too extensive since the particles apparently remain as such (i.e. substantially in the form in which incorporated into the composition) after curing and even after extensive exposure to higher temperatures. Whatever the explanation, the fact is that the compositions of this invention provide a unique combination of desirable physical properties not heretofore attainable.

One of the most significant aspects of the subject invention is that compositions can be made in accordance therewith which may be bent, formed and in some instances even welded along with the substrates to which they are applied. In other words, the compositions are applicable to a substrate material, for example, wire, strip sheet or the like, which may thereafter be drawn, worked, bent or otherwise formed without disrupting the coating. As a matter of fact, in many instances it is found that the bond between the coating and the substrate is enhanced by mechanical working.

The significance of these capabilities of the subject compositions may be appreciated by realizing that it has long been desired to provide corrosion, abrasion, etc. resistant coatings on products such as automotive mufflers, or other intricate structures which are difficult to coat after they are fabricated. With the subject compositions, the substrate material may be coated and thereafter fabricated into its ultimate form leaving the integrity of the protective coating unaffected. In other instances, coatings based on the subject compositions may be applied to metal substrates so that the latter may be more effectively drawn or formed at the same time improving die or tool life due to the lubricity of the coating.

While particularly effective in coating metal surfaces, and further while many applications and illustrations herein contained refer to a metal substrate, it is to be understood that the present invention is not intended to be limited to the coating of metal surfaces. As a matter of fact, the subject compositions have been successfully applied to nonmetallic surfaces such as plastic, paper, fibre, ceramics, wood, etc.

As indicated previously, the phosphate, chromate and metal ions may be added to the composition in various forms, i.e., as acids or acid anhydrides, metal salts or, as regards the metal ions, in a form which dissolves in the acids to produce the metal salts in situ. The following are preferred compounds for addition of the various ions as specified.

Phosphate ion: ortho, meta, pyro or hypo phosphoric acid, the ortho acid being much preferred; the monobasic, dibasic and tribasic metal phosphate salts preferably of the valence +2 or +3 metals, the magnesium salts being most desirable. The metal phosphate used should of course be sufficiently soluble to dissolve in the solution, though this does not mean that high solubility in water is essential since many of the phosphates not highly soluble in water are nevertheless soluble in acid sufficiently to be taken into the solution, at least in small quantity, where one of the other solution ingredients provides the acidity. However, for optimum ease in forming the solution and also for optimum final properties it is desirable to use predominantly the monohydrogen or dihydrogen (i.e. the monobasic or dibasic) salts rather than the tribasic salts.

Among the metal phosphates comprehended by the above for the practice of the invention are the following, it being understood that addition thereof can be either as the anhydrous salt or as is generally more convenient and economical, as the hydrate:

Monobasic magnesium phosphate _____ $Mg(H_2PO_4)_2$.
Dibasic magnesium phosphate _____ $MgHPO_4$.
Tribasic magnesium phosphate _____ $Mg_3(PO_4)_2$.
Monobasic zinc phosphate _____ $Zn(H_2PO_4)_2$.
Tribasic zinc phosphate _____ $Zn_3(PO_4)_2$.
Aluminum phosphate _____ $AlPO_4$.
Ferric phosphate _____ $FePO_4$.
Ferric pyrophosphate _____ $Fe_4(P_2O_7)_3$.
Ferrous phosphate _____ $Fe_3(PO_4)_2$.
Monobasic calcium orthophosphate _____ $Ca(H_2PO_4)_2$.
Dibasic calcium orthophosphate _____ $CaHPO_4$.
Monobasic lithium phosphate _____ $LiH_2PO_4$.
Tribasic lithium phosphate _____ $Li_3PO_4$.

Chromate ion: Chromic acid (or chromic acid anhydride, $CrO_3$); the chromate or dichromate salts preferably of the valence +2 or +3 metals. Again, the magnesium salt is much preferred. The following chromate-containing compounds within the purview of the above, satisfactory for practice of the invention, will illustrate, it being understood here again that addition can be made as the hydrate.

| | |
|---|---|
| Chromic acid | $H_2CrO_4$ or $CrO_3$. |
| Magnesium chromate | $MgCrO_4$. |
| Magnesium dichromate | $MgCr_2O_7$. |
| Zinc chromate | $ZnCrO_4$. |
| Zinc dichromate | $ZnCr_2O_7$. |
| Calcium dichromate | $CaCr_2O_7$. |
| Lithium dichromate | $Li_2Cr_2O_7$. |
| Magnesium dichromate plus sodium dichromate. | |

If it is desired to replace the chromate ion in whole or in part with molybdate ion, any of the following can be used: molybdic acid, $H_2MoO_4$ or $MoO_3$; the molybdates of the valence +2 or +3 metals, zinc molybdate, $ZnMoO_4$, being preferred. There is no special advantage to including the molybdate ion for most uses of the compositions of this invention and molybdate has the disadvantage of higher cost. Also, it does not provide composition properties as good as those attainable with chromate.

Metal ion: Where the phosphate and/or chromate or molybdate ion is furnished to the solution by addition of a metal salt, in accordance with the above, this inherently also supplies metal ion to the solution. Hence, any of the aforementioned phosphates, chromates, dichromates or molybdates can be used as the source of metal ion. Additionally, and as alluded to previously, metal ion can be supplied in a form such as metal oxide, hydroxide, carbonate, etc. which will dissolve in acid, i.e. phosphoric acid, chromic acid or molybdic acid, to produce the metal phosphate, chromate or molybdate, and therefore the metal ion, plus water and/or gas which is evolved. Of course, if the metal ion is added in this form, the other solution additions supply the acidity required to accomplish the acid-base reaction. For example, some of the phosphate ion should be added as phosphoric acid as is preferred, or some of the chromate as chromic acid. The following metal compounds will illustrate those which can be added to generate the metal ion within the solution, by an acid-base reaction, in accordance with the above: magnesium oxide MgO; magnesium hydroxide, $Mg(OH)_2$; zinc oxide, ZnO; zinc hydroxide, $Zn(OH)_2$; aluminum hydroxide, $Al(OH)_3$; lithium oxide, $Li_2O$; lithium carbonate, $Li_2CO_3$; calcium hydroxide $Ca(OH)_2$. Of course, it will be understood that the insoluble refractory metal oxides which are commonly used to manufacture ceramic articles (aluminum oxide being an example) and which can be used as the solid particulate material in the practice of this invention, cannot be conveniently employed as the metal ion additive since by reason of their physical state they are difficult if not impossible to dissolve even in strong acid.

In general, the +2 and +3 valence metals are preferred; magnesium is outstanding though for many uses of the compositions the ferric and aluminum ions, which are +3 valence, will serve to advantage. While not as good as magnesium, zinc ion is also desirable. The valence +1 metals such as lithium, sodium and potassium can be used though generally not to equal advantage. If an alkali metal is used, it is usually preferred that it be present only in minor amount, under about 30% of the total metal ion concentration in mols. Apparently if enough of the desirable valence +2 or +3 metal ion, for example, magnesium, is present it shields, so to speak, the otherwise undesirable characteristics of the alkali metals, two such undesirable characteristics being those of reduced corrosion resistance and lesser flexibility. In general, the only advantage to utilizing such valence +1 metals is that of cost, sodium dichromate, for example, being somewhat less expensive than magnesium dichromate. Silver, while satisfactory, is not as good as the preferred valence +2 and +3 metals and has the disadvantage of greater cost.

For optimum corrosion resistance, it is preferable that the metal ion concentration be at least about 1.5 mols per liter. Further, where the metal cation is all valence +2 or +3 and especially for magnesium as is preferred, it has been found desirable that the molar concentration of the metal ion not substantially exceed about one-half the total of the molar concentration of the phosphate and chromate (and/or molybdate) ions. At the same time, however, it is desirable that the metal ion concentration be at or approach this ratio of one mol per every two mols of phosphate plus chromate (and/or molybdate). For example, in the most preferred compositions where all the metal cation is +2 valence, specifically magnesium, the molar concentration ratio of metal to phosphate to chromate is about 2 to 3 to 1.

Preferred solid particulate materials for the practice of the invention are: (1) for good abrasion resistance, heat resistance, corrosion resistance and also for good electrical or heat conductivity, decorative metallic appearance, and optimum flexibility, the metal powders for example copper powder, silver powder, nickel powder or aluminum powder, the latter especially in spherical form, being much preferred; (2) for electrical insulation or exceptionally high heat resistance, the refractory metal oxides such as silica, zirconia, beryllia or preferably alumina, for example, alumina hydrate, corundum, alundum or fused aluminum oxide all as are commonly used in the manufacture of ceramic articles; (3) also for especially high heat resistance or, in some instance, for exceptionally high abrasion resistance or for electrical semi-conductivity, the refractory carbides, nitrides, silicides and borides such as silicon carbide, tungsten carbide, boron nitride or molybdenum disilicide; (4) for anti-seizing or lubrication, the dry lubricants such as lubricants such as lead oxide, graphite, tungsten disulfide and molybdenum disulfide.

Other solid particulate materials which have been used for various special applications are: glass, lead metasilicate, cadmium fluoride, calcium fluoride, titanium hydride, fumed leaded zinc oxide, zirconium silicate, magnesium silicate, the titanates and zirconates.

Coating and bonding compositions comprehended by the subject invention can be made by mixing the solid particulate material with a solution prepared as follows:

| | |
|---|---|
| Distilled water, $H_2O$<br>Phosphoric acid, preferably the ortho acid which can be added as an 85% aqueous solution | 3 to 6 parts water to 1 part of phosphoric acid. |

At least one compound from the group consisting of

| | |
|---|---|
| Magnesium dichromate, $MgCr_2O_7 \cdot 6H_2O$ | |
| Alkali metal | |
| Dichromate plus magnesium | |
| Dichromate (hydrates) | |
| Zinc chromate, $ZnCrO_4$ | |
| Zinc molybdate, $ZnMoO_4$ | |
| Chromic acid, $CrO_3$ | 8 to 40 grams per 100 cc. of water/acid solution. |
| Molybdic acid, $MoO_3$ | |
| Zinc dichromate, $ZnCr_2O_7 \cdot 3H_2O$ | |
| Magnesium chromate, $MgCrO_4 \cdot 7H_2O$ | |
| Silver dichromate, $Ag_2Cr_2O_7$ | |
| Lithium dichromate, $Li_2Cr_2O_7 \cdot 2H_2O$ | |
| Calcium dichromate $CaCr_2O_7$ | |
| Barium dichromate, $BaCr_2O_7$ | |

At least one compound from the group consisting of

Magnesium oxide, MgO
Magnesium hydroxide, Mg(OH)$_2$
Zinc hydroxide Zn(OH)$_2$
Aluminum hydroxide, Al(OH)$_3$
Magnesium dibasic orthophosphate, MgHPO$_4$·3H$_2$O
Magnesium monobasic orthophosphate MgH$_4$(PO$_4$)$_2$·3H$_2$O
Aluminum orthophosphate, AlPO$_4$
Zinc orthophosphate, Zn$_3$(PO$_4$)$_2$·4H$_2$O
Magnesium orthophosphate, Mg$_3$(PO$_4$)$_2$·4H$_2$O
Ferric orthophosphate, FePo$_4$·2H$_2$O
Ferric pyrophosphate, Fe$_4$(P$_2$O$_7$)$_3$·9H$_2$O
Ferrous orthophosphate, Fe$_3$(PO$_4$)$_2$·8H$_2$O
Zinc Oxide, ZnO
Lithium oxide, Li$_2$O
Lithium carbonate, Li$_2$CO$_3$ } 2 to 30 grams per 100 cc. of water/acid solution.

In general, the lower the molecular weight of the additive or additives selected from each group the less the number of grams required, within the ranges set forth, to provide optimum properties. The following specific examples of compositions formulated in accordance with the invention will serve to further illustrate:

*Example 1*

The formula for this example is given above under the title of Example I. A sheet of ordinary steel stock (SAE 1010 steel) was coated with the composition by spraying, drying at 80° F. and then curing at about 625° F. for 15 minutes. The coated stock could be bent to U-shape, with a short radius curve and then bent back substantially to its original shape without cracking or otherwise disrupting the coating. Corrosion resistance was extremely high; the coated stock withstood 2500 hours in a 5% salt spray chamber without detectable deterioration.

A piece of the coated steel was placed in a furnace alongside a piece of the same sheet steel which was uncoated. The temperature was raised to about 1900° F. at which point the uncoated piece had undergone disintegration whereas the coated piece remained entirely intact. In effect, the coated sheet of ordinary steel substantially duplicated much more expensive stainless steel stock as regards heat and corrosion resistance.

*Example 2*

| | Grams |
|---|---|
| MgCrO$_4$·7H$_2$O | 266 |
| H$_3$PO$_4$ | 98 |
| Mg(H$_2$PO$_4$)$_2$·3H$_2$O | 272 |
| H$_2$O to 1000 cc. | |
| Aluminum powder (spherical 5–10 micron) | 600 |

Tested similarly to Example 1 above for adherence and corrosion resistance with similar results. Steel sheet stock coated with the composition, cured at 625° F. for 15 minutes, withstood 1050° F. for 100 hours with no detectable deterioration.

*Example 3*

Composition the same as in Example 2 except that in place of the aluminum powder, 600 grams of aluminum oxide (325 mesh) was added to the solution as the solid particulate material. The composition was coated onto type 321 stainless steel and cured at 650° F. for 30 minutes. The coated steel was then subjected to 1400° F. for 200 hours with no detectable deterioration of the coating.

*Example 4*

Composition same as in Example 2 except that in place of the aluminum powder, 500 grams of boron nitride (325 mesh) was added to the solution as the solid particulate material. Coating was on type 321 stainless steel, with a cure for 30 minutes at 650° F. The coating withstood 1800° F. for 50 hours without detectable deterioration.

*Example 5*

Same as in Example 4 except that in place of the aluminum powder, 800 grams of silicon carbide (600 mesh) was added to the solution as the solid particulate material. Results were the same as in Example 4. The coating had remarkably good abrasion resistance.

*Example 6*

Composition same as in Example 2 except that in place of the aluminum powder, 300 grams of graphite (5–10 micron) were added to the solution as the solid particulate. Coated on SAE 1010 steel and cured at 600° F. for 30 minutes. Excellent lubricity; also excellent for use in nuclear reactors. Heat and oxidation resistant to 800° F.

*Example 7*

| | Grams |
|---|---|
| CRO$_3$ | 92 |
| H$_3$PO$_4$ | 323 |
| MgO | 72 |
| H$_2$O, to 1000 cc. | |
| Aluminum powder (spherical, 5–10 micron) | 800 |

Coated onto ceramic and cured at 700° F. for 30 minutes. Excellent thermal and electrical conductivity. Heat resistance similar to that of Example 2.

*Example 8*

| | Grams |
|---|---|
| MgCr$_2$O$_7$·6H$_2$O | 348 |
| H$_3$PO$_4$ | 98 |
| Mg(H$_2$PO$_4$)$_2$·3H$_2$O | 272 |
| H$_2$O, to 1000 cc. | |
| Molybdenum disilicide (325 mesh) | 1000 |

Coated onto molybdenum metal; cured at 800° F. for 10 minutes. Oxidation resistant to 2000° F.

*Example 9*

| | Grams |
|---|---|
| CrO$_3$ | 100 |
| H$_3$PO$_4$ | 294 |
| LiOH | 72 |
| H$_2$O, to 1000 cc. | |
| Aluminum powder (5–10 micron) | 800 |

Used as coating and cured as in Example 7. Excellent thermal and electrical conductivity; heat resistant comparable to Example 2. Not as good, however, as regards flexibility as where a +2 valence metal is used such as in Example 7 above.

*Example 10*

| | Grams |
|---|---|
| CaCr$_2$O$_7$·3H$_2$O | 310 |
| H$_3$PO$_4$ | 294 |
| H$_2$O, to 1000 cc. | |
| Aluminum powder (5–10 micron) | 800 |

Used to bond two ceramic tile test pieces. Cured at 625° F. for 30 minutes. About one-half square inch of bonded area withstood over 100 pounds pull without fracture.

Example 11

| | Grams |
|---|---|
| $MgCr_2O_7 \cdot 6H_2O$ | 174 |
| $Na_2Cr_2O_7 \cdot 2H_2O$ | 75 |
| $MgO$ | 40 |
| $H_3PO_4$ | 196 |
| $H_2O$, to 1000 cc. | |
| Silica (325 mesh) | 800 |

Coated onto stainless steel; cured at 700° F. for 10 minutes. Heat resistance similar to Example 3.

Example 12

| | Grams |
|---|---|
| $AlPO_4$ | 122 |
| $CrO_3$ | 100 |
| $H_3PO_4$ | 98 |
| $H_2O$, to 1000 cc. | |
| Aluminum powder (5–10 micron) | 700 |

Coated and cured as in Example 7 with similar test results.

Example 13

| | Grams |
|---|---|
| $MgCr_2O_7 \cdot 6H_2O$ | 174 |
| $Fe_3(PO_4)_2 \cdot 8H_2O$ | 112 |
| $H_3PO_4$ | 196 |
| $H_2O$, to 1000 cc. | |
| Silver (325 mesh) | 600 |

Coated on ceramic; cured at 650° F. for 30 minutes. Excellent electrical and thermal conductivity.

Example 14

| | Grams |
|---|---|
| $MgCr_2O_7 \cdot 6H_2O$ | 88 |
| $CrO_3$ | 50 |
| $Mg(H_2PO_4) \cdot 3H_2O$ | 272 |
| $MgO$ | 5 |
| $H_2O$, to 1000 cc. | |
| Aluminum powder (5–10 micron) | 600 |

Coated, cured and tested as in Example 2 with comparable results though not as excellent as Example 2 for adhesion after bending or for corrosion.

While in al the preferred embodiments, the concentrations of the various ions are within the ranges specified above, somewhat lesser amounts of chromate to as low as .3 mol per liter of the solution and metal to as low as .5 mol per liter of the solution may be used for some applications.

Hence, it will be understood that while the invention has been described in its particulars by reference to various preferred embodiments thereof, various changes and modifications may be made all within the scope of the claims which follow:

I claim:

1. A coating and bonding composition consisting essentially of a dispersion of inorganic solid particulate material having a grain size less than 325 mesh in an aqueous solution the solute of which consists essentially of a combination of inorganic compounds from the group consisting of phosphoric acid, chromic acid, molybdic acid and the metal salts of said acids, the combination of compounds in said solution being such as will provide at least 1 mol per liter dissolved phosphate, at least .3 mol per liter dissolved material from the group consisting of chromate and molybdate, and at least .5 mol per liter dissolved metal, said solid particulate material being substantially insoluble in said solution and being present in an amount of from about 10 to 2000 grams per liter of said solution, said composition being heat curable upon drying thereof to a substantially water-insoluble material with said solid particulate material being bonded therein.

2. A composition as set forth in claim 1 wherein said dissolved metal has a valence of +2.

3. A composition as set forth in claim 1 wherein at least a portion of said dissolved metal is magnesium.

4. A composition as set forth in claim 1 wherein at least a portion of said solid particulate material is metal powder.

5. A composition as set forth in claim 1 wherein at least a portion of said solid particulate material is aluminum powder.

6. A composition as set forth in claim 1 wherein at least a portion of said solid particulate material is from the group consisting of graphite, molybdenum disulphide, tungsten disulphide and lead oxide.

7. A coating and bonding composition consisting essentially of a dispersion of inorganic solid particulate material having a grain size less than 325 mesh in an aqueous solution the solute of which consists essentially of a combination of inorganic compounds from the group consisting of phosphoric acid, chromic acid, molybdic acid and the metal salts of said acids, the combination of inorganic compounds in said solution being such as will provide about from 1 to 4 mols per liter dissolved phosphate, from .5 to 3 mols per liter dissolved material from the group consisting of chromate and molybdate and from 1 to 4 mols per liter dissolved metal, said solid particulate material being substantially insoluble in said solution and being present in an amount of from about 10 to 2000 grams per liter of said solution, said composition being heat curable upon drying thereof to a substantially water-insoluble material with said solid particulate material being bonded therein.

8. A composition as set forth in claim 7 wherein said solid particulate material is from the group consisting of the metal powders and the powdered refractory oxides, carbides, nitrides and silicides.

9. A composition as set forth in claim 7 wherein at least a portion of said solid particulate material is aluminum powder.

10. A composition as set forth in claim 7 wherein at least a portion of said solid particulate material is graphite.

11. A composition as set forth in claim 7 wherein at least a portion of said solid particulate material is molybdenum disulfide.

12. A composition as set forth in claim 7 wherein at least a portion of said solid particulate material is tungsten disulfide.

13. A composition as set forth in claim 7 wherein at least a portion of said solid particulate material is lead oxide.

14. A coating and bonding composition consisting essentially of a dispersion of inorganic solid particulate material having a grain size less than 325 mesh in an aqueous solution the solute of which consists essentially of a combination of inorganic compounds from the group consisting of phosphoric acid, chromic acid and the metal salts of said acids, the combination of compounds in said solution being such as will provide about from 1 to 4 mols per liter dissolved phosphate, from .5 to 3 mols per liter dissolved chromate and from 1.5 to 4 mols per liter dissolved metal, said solid particulate material being substantially insoluble in said solution and being present in an amount of from about 300 to 1000 grams per liter of said solution, said composition being heat curable upon drying thereof to a substantially water-insoluble material with said solid particulate material being bonded therein.

15. A composition as set forth in claim 14 wherein said dissolved metal is predominantly magnesium.

16. A coating and bonding composition as set forth in claim 14 wherein at least a portion of said solid particulate material is aluminum powder having a grain size not exceeding about 10 microns.

17. A coating and bonding composition consisting essentially of a dispersion of inorganic solid particulate material having a grain size less than 325 mesh in an aqueous solution the solute of which consists essentially of a combination of inorganic compounds from the group consisting of phosphoric acid, chromic acid and the metal salts of said acids, the combination of inorganic compounds in said solution being such as will provide about from 1 to 4 mols per liter dissolved phosphate, from .5 to 3 mols per liter dissolved chromate and from 1 to 4 mols per liter dissolved metal, said solid particulate material being substantially insoluble in said solution and being present in an amount of from about 10 to 2000 grams per liter of said solution, the molar concentration of said dissolved metal being approximately one-half the combined molar concentrations of said dissolved phosphate and dissolved chromate, said composition being heat curable upon drying thereof to a substantially water-insoluble material with said solid particulate material being bonded therein.

18. A coating and bonding composition consisting essentially of a dispersion of metal powder having a grain size less than 325 mesh in an aqueous solution the solute of which consists essentially of a combination of inorganic compounds from the group consisting of phosphoric acid, chromic acid, molybdic acid and the metal salts of said acids, the combination of compounds in said solution being such as will provide at least 1 mol per liter dissolved phosphate, at least .3 mol per liter dissolved material from the group consisting of chromate and molybdate and at least .5 mol per liter dissolved metal, said metal powder being substantially insoluble in said solution and being present in an amount of from about 300 to 1000 grams per liter of said solution, at least a portion of said metal powder being spherical aluminum powder having a grain size not exceeding about 10 microns.

19. A coating and bonding composition consisting essentially of a dispersion of spherical aluminum powder having a grain size not exceeding about 10 microns in an aqueous solution the solute of which consists essentially of a combination of inorganic compounds from the group consisting of phosphoric acid, chromic acid and the metal salts of said acids, the combination of inorganic compounds in said solution being such as will provide about from 1 to 4 mols per liter dissolved phosphate, from .5 to 3 mols per liter dissolved chromate and from 1 to 4 mols per liter dissolved metal, said aluminum powder being substantially insoluble in said solution and being present in an amount of from about 300 to 1000 grams per liter of said solution.

20. A composition as set forth in claim 19 wherein the dissolved metal is magnesium.

21. A coating and bonding composition consisting essentially of a dispersion of inorganic solid particulate material having a grain size less than 325 mesh in a solution formed by admixing inorganic compounds, said inorganic compounds consisting essentially of the following in the relative proportions indicated:

| | |
|---|---|
| Orthophosphoric acid (85%) | 1 part |
| Water | 3 to 6 parts per one part of the orthophosphoric acid. |
| At least one compound from the group consisting of chromic acid, molybdic acid and the water soluble metal chromates, dichromates and molybdates | 8 to 40 grams per 100 cc. of said water/acid solution. |
| At least one compound from the group consisting of the metal phosphates, oxides, hydroxides and carbonates | 2 to 30 grams per 100 cc. of said water/acid solution. | said solid particulate material being substantially insoluble in said aqueous solution and being present in an amount of from about 10 to 2000 grams per liter of said solution, said composition being heat curable upon drying thereof to a substantially water-insoluble material with said solid particulate material being bonded therein.

22. A composition as set forth in claim 21 wherein at least a portion of said solid particulate material is metal powder.

23. A composition as set forth in claim 21 wherein at least a portion of said solid particulate material is aluminum powder having a grain size not exceeding about 10 microns.

24. A composition as set forth in claim 21 wherein at least a portion of said solid particulate material is graphite.

25. A composition as set forth in claim 21 wherein at least a portion of said solid particulate material is molybdenum disulfide.

26. A composition as set forth in claim 21 wherein at least a portion of said solid particulate material is tungsten disulfide.

27. A composition as set forth in claim 21 wherein at least a portion of said solid particulate material is lead oxide.

28. A method for coating a surface comprising the steps of applying to the surface a composition consisting essentially of a uniform mixture of inorganic solid particulate material having a grain size less than 325 mesh in an aqueous solution the solute of which consists essentially of a combination of inorganic compounds from the group consisting of phosphoric acid, chromic acid, molybdic acid and the metal salts of said acids, the combination of compounds in said solution being such as will provide about from 1 to 4 mols per liter dissolved phosphate, from .5 to 3 mols per liter dissolved material from the group consisting of chromate and molybdate, and from 1.5 to 4 mols per liter dissolved metal, said solid particulate material being substantially insoluble in said solution and being present in an amount of from about 10 to 2000 grams per liter of said solution; drying said composition; and then curing said composition by heating to a temperature of at least about 500° F. for a time sufficient to cause said composition to become insoluble in water with said solid particulate material being bonded therein.

29. A method for coating and bonding comprising the steps of applying to a substrate surface a composition consisting essentially of a uniform mixture of metal powder having a grain size less than 325 mesh in an aqueous solution the solute of which consists essentially of a combination of inorganic compounds from the group consisting of phosphoric acid, chromic acid, and the metal salts of said acids, the combination of inorganic compounds in said solution being such as will provide at least 1 mol per liter dissolved phosphate, at least .3 mol per liter dissolved chromate and at least .5 mol per liter dissolved metal, said metal powder being present in an amount of from about 300 to 1000 grams per liter of said solution and being substantially insoluble in said solution; drying said composition; and then curing the composition by heating to a temperature at which the composition becomes insoluble in water.

30. An article of manufacture comprising a solid substrate having deposited thereon a layer formed by coating said substrate and then drying and heat curing to water insolubility a composition consisting essentially of a mixture of metal powder having a grain size less than 325 mesh in an aqueous solution the solute of which consists essentially of a combination of inorganic compounds from the group consisting of phosphoric acid, chromic acid, molybdic acid and the metal salts of said acids, the combination of compounds in said solution being such as will provide at least 1 mol per liter dissolved phosphate, at least .3 mol per liter dissolved material selected from the group consisting of chromate and molybdate, and at least .5 mol per liter dissolved metal, said metal powder being substantially insoluble in said solution, being present in said solution in an amount of about 300 to 1000 grams per liter of said solution and being bonded in said layer after curing thereof.

31. An article of manufacture comprising a solid substrate having deposited thereon a layer formed by coating said substate and then drying and heat curing to water-insolubility a composition consisting essentially of a uniform mixture of inorganic solid particulate material having a grain size less than 325 mesh in an aqueous solution the solute of which consists essentially of a combination of inorganic compounds from the group consisting of phosphoric acid, chromic acid, molybdic acid and the metal salts of said acids, the combination of compounds in said solution being such as will provide at least about from 1 to 4 mols per liter dissolved phosphate, from .5 to 3 mols per liter dissolved material from the group consisting of chromate and molybdate, and from 1 to 4 mols per liter dissolved metal, said solid particulate material being substantially insoluble in said solution, being present in said composition in an amount of from about 10 to 2000 grams per liter of said solution and being bonded in said layer after curing thereof.

32. An article as set forth in claim 31 wherein said metal is predominantly magnesium.

33. An article as set forth in claim 31 wherein said solid particulate material is spherical grain aluminum powder having a grain size not exceeding about 10 microns.

References Cited by the Examiner

UNITED STATES PATENTS

| | | |
|---|---|---|
| 1,291,352 | 1/1919 | Allen. |
| 1,947,122 | 2/1935 | Burdick et al. |
| 2,357,269 | 8/1944 | Russell et al. _____ 106—14 |
| 2,465,247 | 3/1949 | McBride. |
| 2,702,425 | 2/1955 | Thompson. |

ALEXANDER H. BRODMERKEL, *Primary Examiner.*

MORRIS LIEBMAN, *Examiner.*